J. S. GANDER.
SAFETY DEVICE FOR OIL BURNING APPARATUS.
APPLICATION FILED MAR. 8, 1921.

1,393,212.

Patented Oct. 11, 1921.

INVENTOR:
James Sandford Gander
By Wm Wallace White
ATTY.

J. S. GANDER.
SAFETY DEVICE FOR OIL BURNING APPARATUS.
APPLICATION FILED MAR. 8, 1921.
1,393,212.
Patented Oct. 11, 1921.
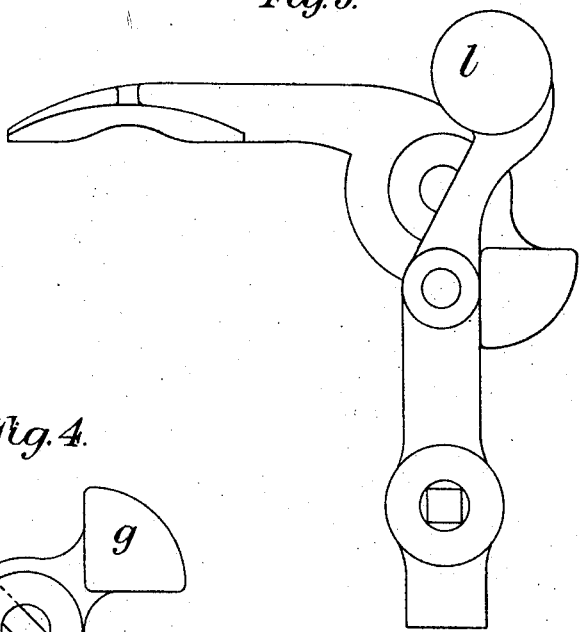
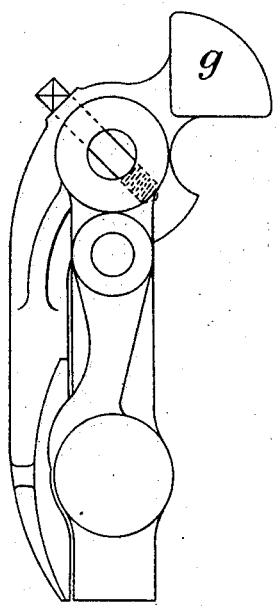
INVENTOR:
James Sandford Gander
Wm Wallace White
ATTY.

UNITED STATES PATENT OFFICE.

JAMES SANDFORD GANDER, OF FOREST GATE, ENGLAND.

SAFETY DEVICE FOR OIL-BURNING APPARATUS.

1,393,212.  Specification of Letters Patent.  Patented Oct. 11, 1921.

Application filed March 8, 1921. Serial No. 450,724.

*To all whom it may concern:*

Be it known that I, JAMES SANDFORD GANDER, of 40 Claremont road, Forest Gate, Essex, England, a subject of the King of Great Britain and Ireland, have invented certain new and useful Safety Devices for Oil-Burning Apparatus, of which the following is a specification.

This invention relates to a safety device for use with oil burning apparatus.

The object of this invention is to provide a safety device which will prevent an oil burner being removed until the oil supply is cut off, or prevent the oil supply being turned on again till the burner has been properly replaced and generally to safeguard the operator from burns due to a leak of oil under pressure and at a high temperature.

A safety device made in accordance with this invention comprises an oil supply cock, an arm mounted on the spindle of said cock, said arm being adapted to form a splash guard in front of the oil burner, a guard lever pivotally mounted and adapted to prevent access to the burner fixing device in one position, means for interlocking the said guard lever and the arm on the cock so that the guard lever cannot uncover the said burner fixing device till the arm on the cock has been moved and the oil cock shut, and means for preventing the oil cock being turned on again till the guard lever is restored to the position where it covers the burner fixing device.

Referring to the drawings filed herewith:—

Fig. 4 is an end elevation showing the cock arm open.

Fig. 5 is an end elevation showing the cock arm shut and the guard lever released and raised clear.

In one form of apparatus made in accordance with this invention the cock arm $a$ is mounted upon a short spindle $b$ to which it is secured by means of the set bolt $c$. The spindle is held in position by the collar $d$. At the end of the spindle near the oil cock $e$ it engages with the cock spindle by means of a square recess. The gland of the oil cock can be repacked without removing the cock arm parts. To disconnect the cock arm the set bolt is unscrewed, the spindle $d$ withdrawn and the cock arm can then be lifted clear.

At the longer arm of the cock arm the splash guard $f$ prevents oil from squirting over the operator or adjacent furnaces should a burner joint be defective. At the opposite end the counterweight $g$ is made slightly heavier so that there is no tendency for the weight of the splash guard to effect a downward movement of the cock.

Figure 1:
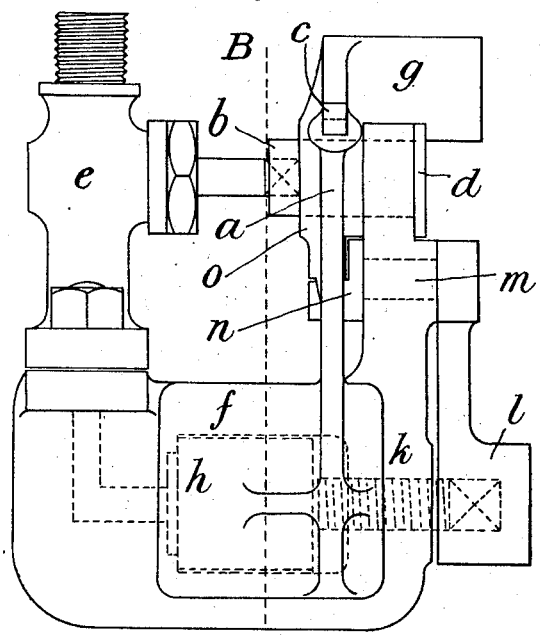
Figure 1 is a front elevation of one form of apparatus made in accordance with this invention.

The end of a burner $h$ and its joint with the burner holder $j$ and the set screw $k$ which holds the burner against its joint are shown in dotted lines in Fig. 1. The end of the guard lever $l$ covers the end of the set screw to which an operator must have access in order to remove the burner. This lever turns in an arc about the spindle $m$ when the locking device of the end of the spindle $n$ and the part of the cock arm $o$ are in the correct position to allow the movement.

Figure 2:
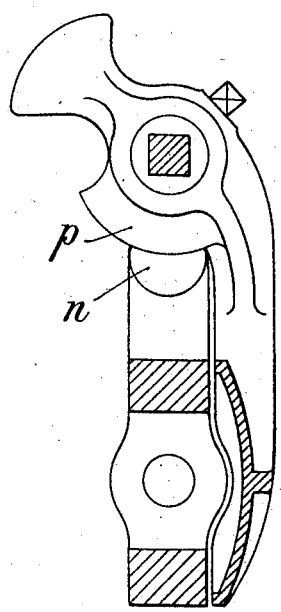
Fig. 2 is a sectional end elevation showing the cock arm open.
Figure 3:
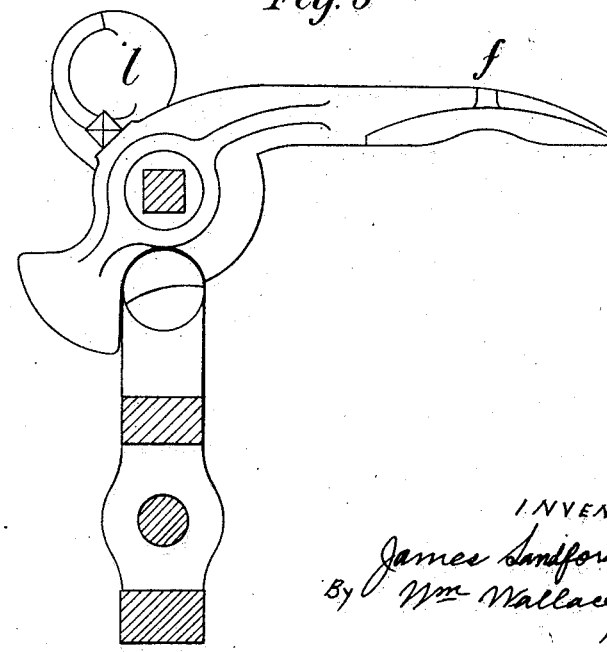
Fig. 3 is a sectional end elevation showing the cock arm shut.

The locking arrangement is made by machining a section of the end of the shaft $n$ in the shape of an arc of which the center is that about which the cock arm swings, and the under side of the cock $p$ is shaped to correspond as in Fig. 2. $p$ is adjacent to $n$. When in this position the cock arm can be swung to the shut or open position but the guard lever cannot be moved. When the cock arm is moved to the shut position as in Fig. 3 the part of the cock arm which is recessed to the shape of spindle $n$ allows the guard lever to be swung over to position as shown in Fig. 3 at which point the cock arm is now locked and cannot be opened until the guard lever is returned to its original position.

As shown in Fig. 5 the cock arm is prevented from turning too far by the counterweight which touches the bearing at that position, and the guard lever is also arrested at this point by the counterweight.

In operation when a burner chokes and requires changing in order to obtain access to the burner screw it is necessary to raise the cock arm to position as in Fig. 5. This movement turns the oil cock and shuts off the oil supply and the guard lever can be swung free for access to the burner holding screw. The cock arm cannot now be operated until the guard lever is returned. Should a joint leak the splash guard prevents injury to the operator. When the guard lever is down the cock arm can be used as a quick means of shutting off fires as this arm can be swung to open or shut when the guard lever is down.

What I claim and desire to secure by Letters Patent is:—

1. In oil burning apparatus an oil supply cock to the burner, means for retaining the burner in position, means for guarding the burner, and means for interlocking the control of the cock, the retaining device and the guard so that the guard cannot be raised till the cock is shut off.

2. In oil burning apparatus an oil supply cock to the burner, means for retaining the burner in position, means for guarding the burner, and means for interlocking the control of the cock, the retaining device and the guard so that the guard cannot be raised till the cock is shut off and so that the burner cannot be moved till the guard is raised and the oil shut off.

3. A safety device for oil burning apparatus comprising in combination a casing, a burner in said casing, means for retaining said burner in position, an oil supply cock carried on said casing, a spindle on said oil supply cock, an arm mounted on said spindle a splash guard formed on said arm adapted to cover an opening in said burner casing, a guard lever pivotally mounted on said casing and adapted to prevent access to said burner retaining means in one position and means for preventing the movement of said guard lever till said splash guard is covering said opening in the burner casing.

4. A safety device for oil burning apparatus comprising in combination, a casing, a burner in said casing, means for retaining said burner in position, an oil supply cock carried on said casing, a spindle on said oil supply cock, an arm mounted on said spindle, a splash guard formed on said arm adapted to cover an opening in said burner casing, a guard lever pivotally mounted on said casing and adapted to prevent access to said burner retaining means in one position and means for preventing the movement of said guard lever till said splash guard is covering said opening in the burner casing said means for preventing the movement of the guard lever comprising a circular recess formed in said arm, a semi-circular boss formed on said guard lever adapted to prevent movement thereof until said arm is brought into such a position that said circular recess coincides with said semi-circular boss in which position said splash guard is covering the said opening in the burner casing.

5. A safety device for oil burning apparatus comprising in combination a casing, a burner in said casing, means for retaining said burner in position, an oil supply cock carried on said casing, a spindle on said oil supply cock, an arm mounted on said spindle, a splash guard formed on said arm adapted to cover an opening in said burner casing, a guard lever pivotally mounted on said casing and adapted to prevent access to said burner retaining means in one position and means for preventing the movement of said guard lever till said splash guard is covering said opening in the burner casing said means for preventing the movement of the guard lever comprising a circular recess formed in said arm, a semi-circular boss formed on said guard lever adapted to prevent movement thereof until said arm is brought into such a position that said circular recess coincides with said semi-circular boss in which position said splash guard is covering the said opening in the burner casing, said means for retaining said burner in position comprising a screw adapted to bear on the said burner, a head on said screw adapted to be covered by said guard lever.

In testimony whereof I have signed my name to this specification.

JAMES SANDFORD GANDER.